US010506249B2

(12) United States Patent
Mukherjee et al.

(10) Patent No.: US 10,506,249 B2
(45) Date of Patent: Dec. 10, 2019

(54) SEGMENTATION-BASED PARAMETERIZED MOTION MODELS

(71) Applicant: GOOGLE LLC, Mountain View, CA (US)

(72) Inventors: Debargha Mukherjee, Cupertino, CA (US); Yuxin Liu, Palo Alto, CA (US); Sarah Parker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 38 days.

(21) Appl. No.: 15/838,748

(22) Filed: Dec. 12, 2017

(65) Prior Publication Data

US 2018/0270497 A1 Sep. 20, 2018

Related U.S. Application Data

(60) Provisional application No. 62/471,659, filed on Mar. 15, 2028.

(51) Int. Cl.
*H04N 19/517* (2014.01)
*H04N 19/80* (2014.01)
(Continued)

(52) U.S. Cl.
CPC ......... *H04N 19/517* (2014.11); *H04N 19/521* (2014.11); *H04N 19/557* (2014.11); *H04N 19/80* (2014.11)

(58) Field of Classification Search
CPC .... H04N 19/517; H04N 19/17; H04N 19/543; H04N 19/54; H04N 19/20; H04N 19/547; H04N 19/557; H04N 19/521; H04N 19/80
See application file for complete search history.

(56) References Cited

U.S. PATENT DOCUMENTS 5,510,838 A * 4/1996 Yomdin ................. H04N 19/54 348/384.1
9,438,910 B1 * 9/2016 Han ..................... H04N 19/105
(Continued)

FOREIGN PATENT DOCUMENTS

EP 1404135 A2 3/2004

OTHER PUBLICATIONS

Dufaux F et al.; "Motion Estimation Techniques for Digital TV: A Review and A New Contribution"; Proceedings of the IEEE, New York; Jun. 1, 1995; pp. 858-876.
(Continued)

*Primary Examiner* — Joseph Suh
(74) *Attorney, Agent, or Firm* — Young Basile Hanlon & MacFarlane, P.C.

(57) ABSTRACT

A method includes segmenting the video frame with respect to a reference frame resulting in a segmentation, determining a first motion vector for the current block based on the segmentation, determining a second motion vector for the current block using translational motion compensation, and encoding, for the current block, the one of the first motion vector and the second motion vector corresponding to a smaller error. The segmentation includes a segment containing the current block and a parameterized motion model for the segment. Another method includes identifying a parameterized motion model corresponding to a motion model type, associating the parameterized motion model with a segment of a reference frame, and, in response to determining that the current block is encoded using the parameterized motion model, decoding the current block using the parameterized motion model.

12 Claims, 10 Drawing Sheets

600

602 SEGMENT A VIDEO FRAME WITH RESPECT TO A REFERENCE FRAME RESULTING IN A SEGMENTATION, THE SEGMENTATION COMPRISING A SEGMENT CONTAINING A CURRENT BLOCK AND A PARAMETERIZED MOTION MODEL FOR THE SEGMENT

604 DETERMINE A FIRST MOTION VECTOR FOR THE CURRENT BLOCK BASED ON THE SEGMENTATION

606 DETERMINE A SECOND MOTION VECTOR FOR THE CURRENT BLOCK USING TRANSLATIONAL MOTION COMPENSATION

608 ENCODE, FOR THE CURRENT BLOCK, THE ONE OF THE FIRST MOTION VECTOR AND THE SECOND MOTION VECTOR CORRESPONDING TO A SMALLER ERROR

(51) Int. Cl.
*H04N 19/513* (2014.01)
*H04N 19/557* (2014.01)

(56) References Cited

U.S. PATENT DOCUMENTS

| | | | | |
|---|---|---|---|---|
| 2003/0202596 | A1* | 10/2003 | Lainema | H04N 19/56 375/240.16 |
| 2004/0091171 | A1* | 5/2004 | Bone | G06K 9/6202 382/284 |
| 2006/0227865 | A1* | 10/2006 | Sherigar | H04N 19/129 375/240.03 |
| 2013/0028325 | A1* | 1/2013 | Le Floch | H04N 19/56 375/240.16 |
| 2014/0029675 | A1* | 1/2014 | Su | H04N 19/105 375/240.16 |
| 2014/0324247 | A1* | 10/2014 | Jun | G07C 5/0866 701/1 |
| 2015/0325001 | A1* | 11/2015 | Riemens | H04N 5/144 382/103 |
| 2017/0301096 | A1* | 10/2017 | Weese | G06T 19/00 |
| 2018/0368731 | A1* | 12/2018 | Oh | A61B 6/00 |

OTHER PUBLICATIONS

Moscheni et al; "A new two-stage global/ local motion estimation based on a background/foreground segmentation", 1995 International Conference on Acoustics, Speech and Signal Processing; May 1995; pp. 2261-2264.
International Search Report and Written Opinion for Internation Application No. PCT/US2017/059306; dated Feb. 2, 2018.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

SEGMENTATION-BASED PARAMETERIZED MOTION MODELS

CROSS-REFERENCE TO RELATED APPLICATION(S)

This application claims priority to and the benefit of U.S. Provisional Application Patent Ser. No. 62/471,659, filed Mar. 15, 2017, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations for encoding and decoding blocks using segmentation-based parameterized motion models.

A method of encoding a current block of a video frame according to one implementation of the disclosure includes segmenting the video frame with respect to a reference frame resulting in a segmentation, determining a first motion vector for the current block based on the segmentation, determining a second motion vector for the current block using translational motion compensation, and encoding, for the current block, the one of the first motion vector and the second motion vector corresponding to a smaller error. The segmentation includes a segment containing the current block and a parameterized motion model for the segment.

An apparatus configured to encode a current block of a video frame according to another aspect of the disclosure includes a processor and a non-transitory storage medium. The processor is configured to execute instructions stored in the non-transitory storage medium to segment the video frame with respect to a reference frame resulting in a segmentation, determine a first motion vector for the current block based on the segmentation, determine a second motion vector for the current block using translational motion compensation, and encode, for the current block, the one of the first motion vector and the second motion vector corresponding to a smaller error. The segmentation includes a segment containing the current block and a parameterized motion model for the segment.

A method of decoding a current block of a video frame according to one implementation of the disclosure includes identifying a parameterized motion model corresponding to a motion model type, associating the parameterized motion model with a segment of a reference frame, and, in response to determining that the current block is encoded using the parameterized motion model, decoding the current block using the parameterized motion model.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
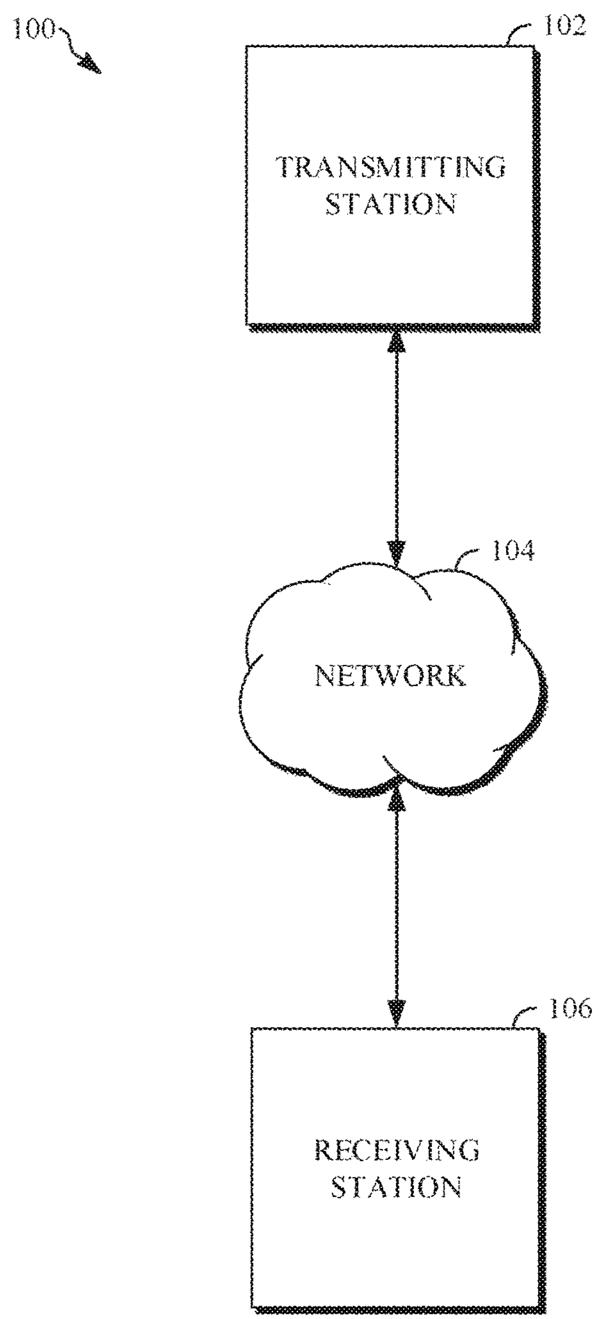
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of a video stream using pixels peripheral to the block; that is, using pixels that are in the same frame as the block but that are outside the block.

Encoding using temporal similarities can be known as inter prediction. Inter prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. Inter prediction can be performed using a motion vector that represents translational motion, i.e., pixel shifts of a prediction block in a reference frame in the x- and y-axes as compared to the block being predicted. Some codecs use up to eight reference frames, which can be stored in a frame buffer. The motion vector can refer to (i.e., use) one of the reference frames of the frame buffer.

Two predictor blocks can be combined to form a compound predictor for a block or region of a video image. A compound predictor can be created by combining two or more predictors determined using, for example, the aforementioned prediction methods (i.e., inter and/or intra prediction). For example, a compound predictor can be combination of a first predictor and a second predictor which can be two intra predictors (i.e., intra+intra), an intra predictor and an inter predictor (i.e., intra+inter) or two inter predictors (i.e., inter+inter).

The video compression and decompression methods of motion compensation described above (herein referred to as translational motion compensation or translational motion) assume purely translational motion between blocks. Translational motion compensation models are performed using rectangular transformations.

However, not all motion within a block can be described using translational motion models with respect to a reference block of a reference frame. For example, some motion may include scaling, shearing, or rotating motion, either alone or with translational motion. Such motion can be attributed, for example, to camera motion and is applicable to all, or at least many, blocks of a frame. As such, the motion is "global" to a frame. In encoding blocks using inter prediction, the global motion may be used to produce a reference block. Alternatively, the translational motion vector(s) found by motion searching can be used.

Global motion may be represented by a "parameterized motion model" or "motion model." A single motion model for each reference frame may not accurately predict all of the underlying motion of the frame. For example, a single motion model for a reference frame performs well with respect to rate-distortion optimization for video with consistent motion. However, a video frame may include two or more moving segments comprising a collection of blocks of the video frame. The segments may comprise, for example, one or more foreground objects moving along different directions and a background that moves along yet another direction. In particular, for example, video with strong parallax may not obtain consistent gains from using the single motion model.

Implementations of this disclosure describe the use of multiple motion models per reference frame. For several reference frames, the current video frame may be segmented with respect to the reference frame and parameterized motion models may be identified for the segments. Each of the parameterized motion models associated with a segment corresponds to a motion model type. The segmentation of the current video frame with respect to a reference frame results in a segment containing the current block. As such, if the current frame is segmented with respect to three reference frames, then the segmentation results in three segments (one corresponding to each reference frame) containing the current block. The parameterized motion models of the segments containing the current block can be used to generate a prediction block for the current block. Further details of techniques for using segmentation-based parameterized motion models for encoding and decoding a current block of a video frame are described herein with initial reference to a system in which they can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
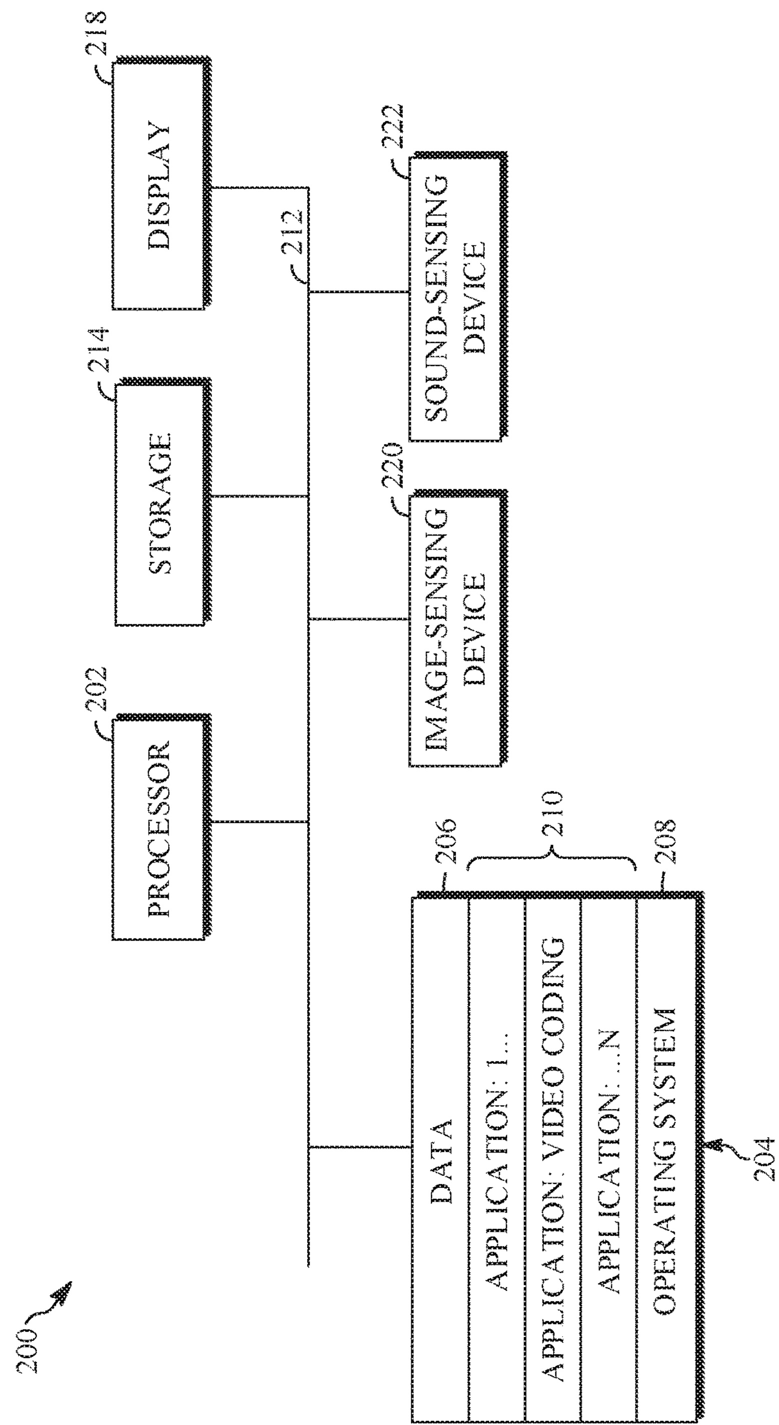
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown (e.g., the CPU 202), advantages in speed and efficiency can be achieved by using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
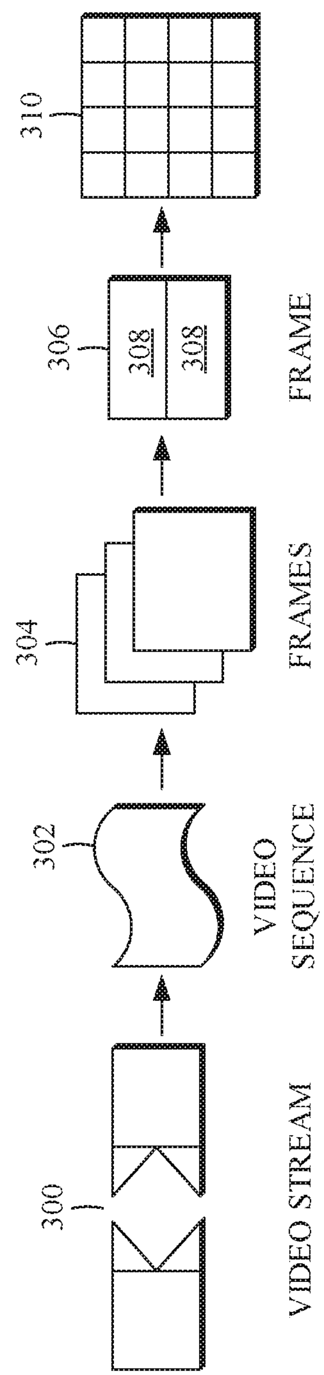
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
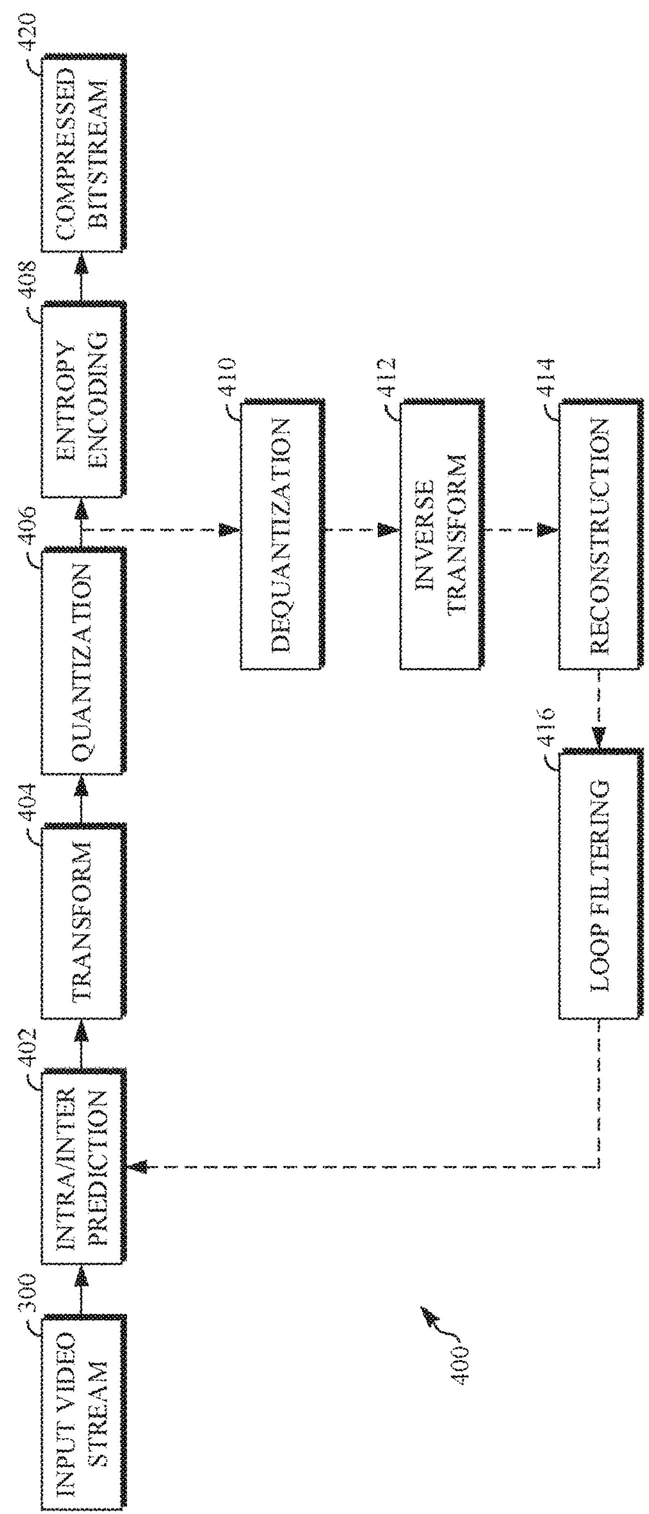
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using parameterized motion model identified for encoding a current block of a video frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block (which may include, for example, the type of prediction used, transform type, motion vectors and quantizer value), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process (described below), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
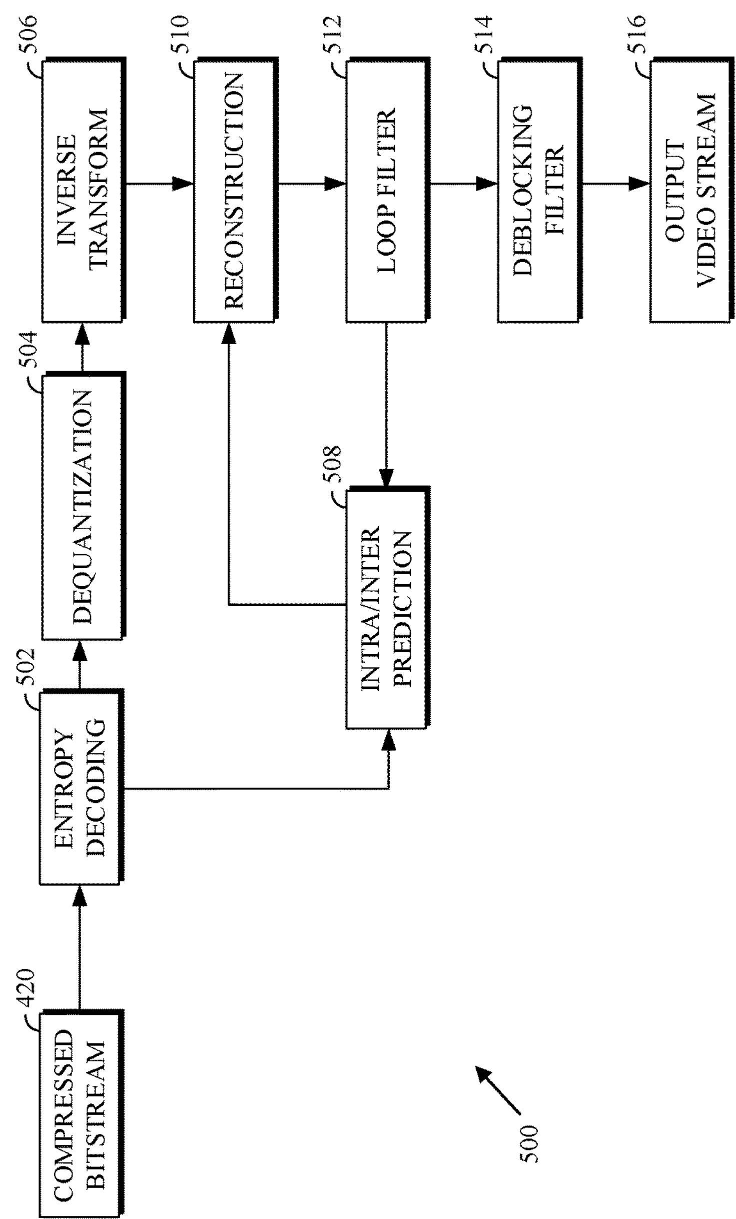
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
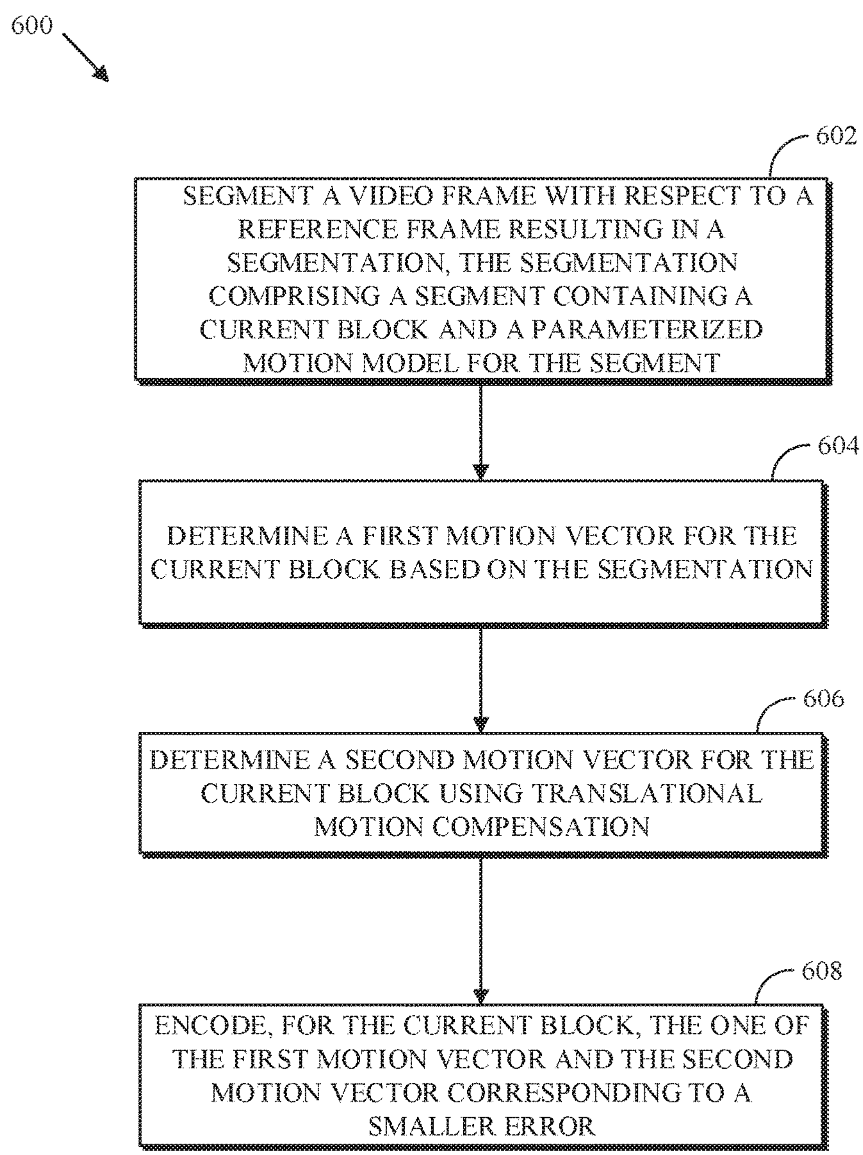
FIG. 6 is a flowchart diagram of a process for encoding a current block using segmentation-based parameterized motion models according to an implementation of this disclosure.

FIG. 6 is a flowchart diagram of a process 600 for encoding a current block using segmentation-based parameterized motion models according to an implementation of this disclosure. The process 600 can be implemented in an encoder such as the encoder 400 of FIG. 4.

The process 600 can be implemented, for example, as a software program that can be executed by computing devices such as transmitting station 102. The software program can include machine-readable instructions (e.g., executable instructions) that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400 of FIG. 4.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

Figure 7:
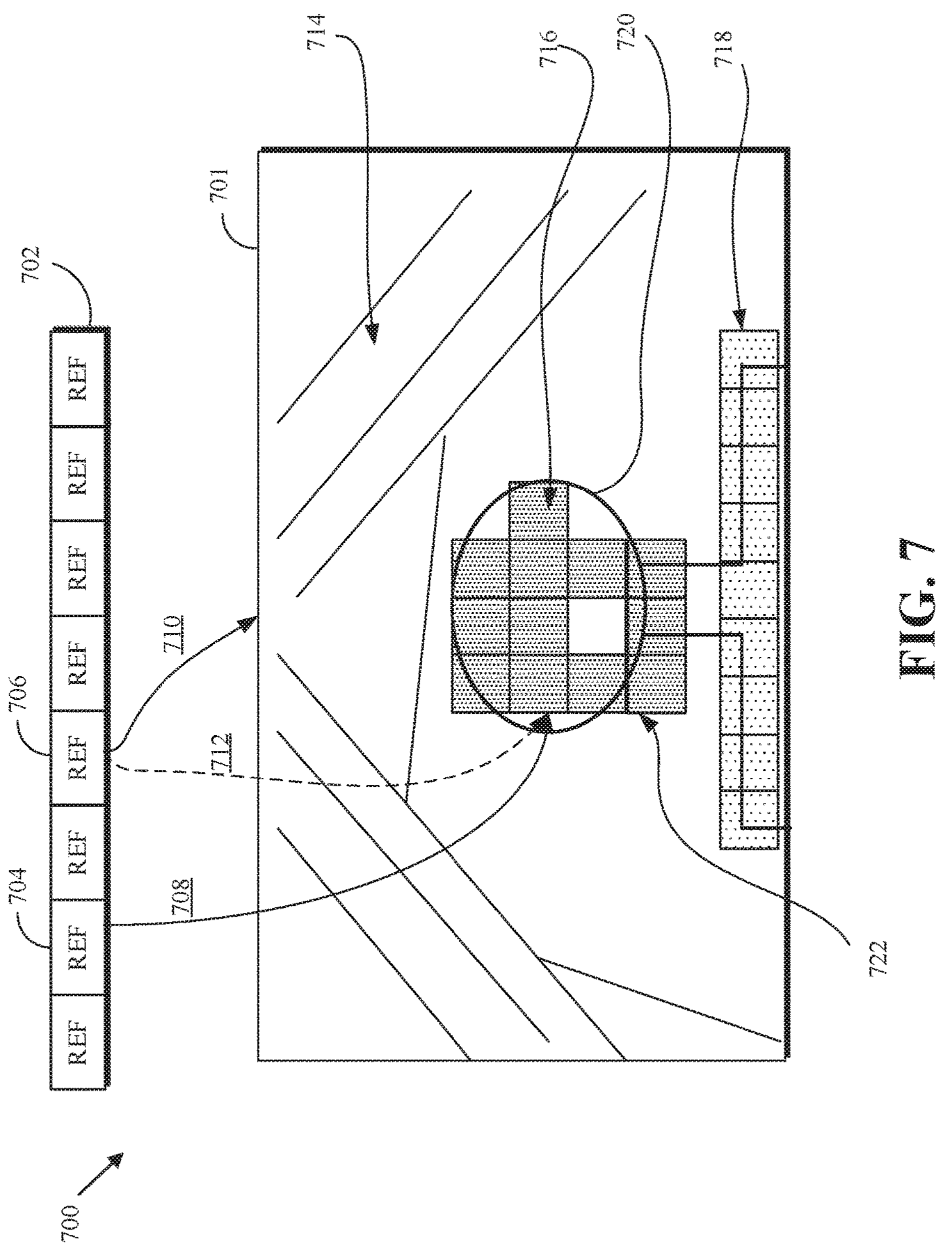
FIG. 7 is a diagram of a frame segmentation according to implementations of this disclosure.

The process 600 is described with reference to FIG. 7. FIG. 7 is a diagram 700 of a frame segmentation according to implementations of this disclosure. FIG. 7 includes a current frame 701. Blocks of the current frame 701 can be encoded using reference frames, such as a reference frame 704 and a reference frame 706, of a frame buffer 702. The current frame 701 includes the head and shoulders of a person 720 and other background objects.

At 602, the process 600 segments the video frame with respect to a reference frame resulting in a segmentation. The segmentation can include one or more segments. The segmentation includes a segment containing the current block and a parameterized motion model for the segment. FIG. 7 depicts three segments: a segment 722 depicted by a group of shaded blocks, a segment 718 depicted by another group of differently shaded blocks, and a segment 714, which is a group that includes the rest of the blocks of the frame constituting the background of the frame. The segment 722 includes the current block 716.

For each of at least some of the reference frames of the frame buffer 702, the process 600 can segment the current frame 701. The process 600 can use an image segmentation technique that leverages the motion of objects between a reference frame and the current frame. A parameterized motion model is then associated with each segment as further described with respect to FIG. 8.

Image segmentation can be performed using interest points. For example, the process 600 can determine first interest points in a reference frame, such as the reference frame 704, and second interest points in the current frame 701. The Features from Accelerated Segment Test (FAST) algorithm can be used to determine the first interest points and the second interest points. The first interest points and the second interest points are then matched. The process 600 can use the matched interest points to determine a parameterized motion model for the matching interest points.

The process 600 can use the Random Sample Consensus (RANSAC) method to fit a model (i.e., a parameterized motion model) to the matched points. RANSAC is an iterative algorithm that can be used to estimate model parameters (i.e., the parameters of the parameterized motion model) from data that contain inliers and outliers. Inliers are the data points (i.e., pixels) of the current frame that fit the parameterized motion model. The process 600 can determine a segment based on the inliers. That is, the process 600 can include the inliers in one segment. The segment (referred to as a foreground segment) based on the inliers may correspond to motion in the current frame corresponding to foreground objects. However, that need not be the case. That is, the foreground segment may include background objects or blocks. The foreground segment may not include all foreground objects or blocks.

"Outliers" are the data points (i.e., pixels) of the current frame that do not fit the parameterized motion model. The process 600 can determine a second segment based on the outliers. The segment (referred to as a background segment) based on the outliers may correspond to relatively static background objects of the current frame. However, that need not be the case. Alternatively, instead of determining a second segment based on the outliers, the process 600 can use the outliers to determine additional segments. For example, the process 600 can recursively apply the same process as described above to determine additional segments. For example, by applying the process described above to the current frame 701 and using the reference frame 704, the process 600 determined the three segments 714, 718, and 722. The two segments 718 and 722 may be identified for the person 720 in a case where, for example, the shoulders of the person 720 are moving, with respect to a reference frame, in one direction while the head is moving another direction.

The process 600 can determine a parameterized motion model (for example, using RANSAC) based on a motion model type. For example, the RANSAC algorithm can determine a parameterized motion model based on a motion model type provided by the process 600. Different motion model types can be available. Available motion model types include, in increasing complexity, a translational motion model type, a similarity motion model type, an affine motion model type, and a homographic motion model type. Additional or fewer motion model types may be available. Some of the motion model types are explained further with respect to FIGS. 9A-9D.

In some situations, the parameterized motion model determined by the RANSAC method may contain more parameters than are necessary to provide a good approximation (e.g., with respect to an error metric) of the global motion for that segment. For example, requesting an affine model from RANSAC may return a six-parameter model (as described with respect to FIGS. 9A-9D), even though a four-parameter model is sufficient to provide a good approximation of the segment. As such, the process 600 can iteratively evaluate the available model types starting from a least complex motion model type (e.g., the translation motion model type) to a most complex model (e.g., the homographic motion model type). If a lower complexity model is determined to produce an error metric within a predefined threshold, then the parameterized motion model corresponding to the lower complexity model is determined to be the parameterized motion model of the segment.

In an implementation an error advantage associated with a model type can be used as the error metric. The error advantage E can be defined as $$E=\Sigma\alpha|c_{xy}-w_{xy}|^{0.6}$$

In the equation above, $\alpha$ is a weight value, $c_{xy}$ is the pixel at (x, y) in the current frame, and $w_{xy}$ is the pixel at (x, y) in the warped frame as described below. If a model type produces an error advantage E below a predefined threshold, then the parameterized motion model corresponding to the model type is associated with the segment. If no model type produces an error advantage E below the predefined threshold, then the translation motion model type can be assumed for the segment.

In an implementation, the process 600 does not evaluate the homographic motion model type; rather the process 600 stops at the similarity motion model type. This is so in order to reduce decoder complexity.

The process 600 can segment the current frame with respect to (or based on) each of the reference frames of the frame buffer 702. In FIG. 7, the frame buffer 702 includes eight (8) reference frames. Assuming that the process 600 determines two (2) segments (i.e., a foreground segment and a background segment) per reference frame, the segmentation results in a total of 16 segments. Each of the 16 segments corresponds to a respective parameterized motion model resulting in 16 parameterized motion models.

As will be explained further with respect to FIG. 8, a prediction block for a current block is determined based on the available segments that contain the current block in the reference frames. As such, if an encoder, such as the encoder 400 of FIG. 4, determines a prediction block using the 16 parameterized motion models, then a decoder, such as the decoder 500 of FIG. 5, also uses the 16 parameterized motion models to reconstruct the current block. As such, the 16 parameterized motion models are encoded in an encoded bitstream, such as the bitstream 420 generated by the encoder 400 and received by the decoder 500.

Encoding, in the encoded bitstream, the parameters of, e.g., 16 parameterized motion models may outweigh the prediction gains of segmentation-based parameterized motion models. As such, the process 600 can determine a subset of the reference frames of the frame buffer that results in the best fit for a specific segment. For a segment, a number of reference frames (e.g., three frames) are selected and the parameterized motion models with respect to these frames are determined and encoded in the encoded bitstream. For example, the process 600 can determine, for a segment, the parameterized motion models based on the golden reference frame, alternative reference frame, and the last reference frame of the frame buffer. The golden reference frame can be a reference frame available as a forward prediction frame for encoding a current frame. The last reference frame can be available as a forward prediction frame for encoding the current frame. The alternative reference frame can be available as a backward reference frame for encoding the current frame.

Encoding a parameterized motion model can mean encoding the parameters of the parameterized motion model in the header of the current frame being encoded. Alternatively, encoding the parameterized motion model can mean encoding the motion model type corresponding to the parameterized motion model.

In the case where the motion model type is encoded, a decoder, such as the decoder 500 of FIG. 5, decodes the motion model type and determines the parameters of the parameterized motion model of the motion model type in a similar way to that of the encoder. In order to limit decoder complexity, the encoder can encode a motion model type that is less complex than the most complex motion model type. That is, for example, the encoder can determine a parameterized motion model for a segment using a motion model type no more complex than the similarity motion model type.

Referring again to FIG. 7, the foreground segment 722 is obtained from the reference frame 704 (as indicated by line 708). The background segment 714 is obtained from the reference frame 706 (as indicated by line 710). That is, each segment can be obtained from a different reference frame. However, this is not necessary. Some of the segments can be obtained from the same reference frames. For example, and as illustrated in FIG. 7, the foreground segment 722 and the background segment 714 can be obtained from the same reference frame 706 (as indicated by line 712 and the line 710, respectively). The segment 718, while not specifically indicated in FIG. 7, can also be obtained from any of the reference frames of the frame buffer 702.

Figure 8:
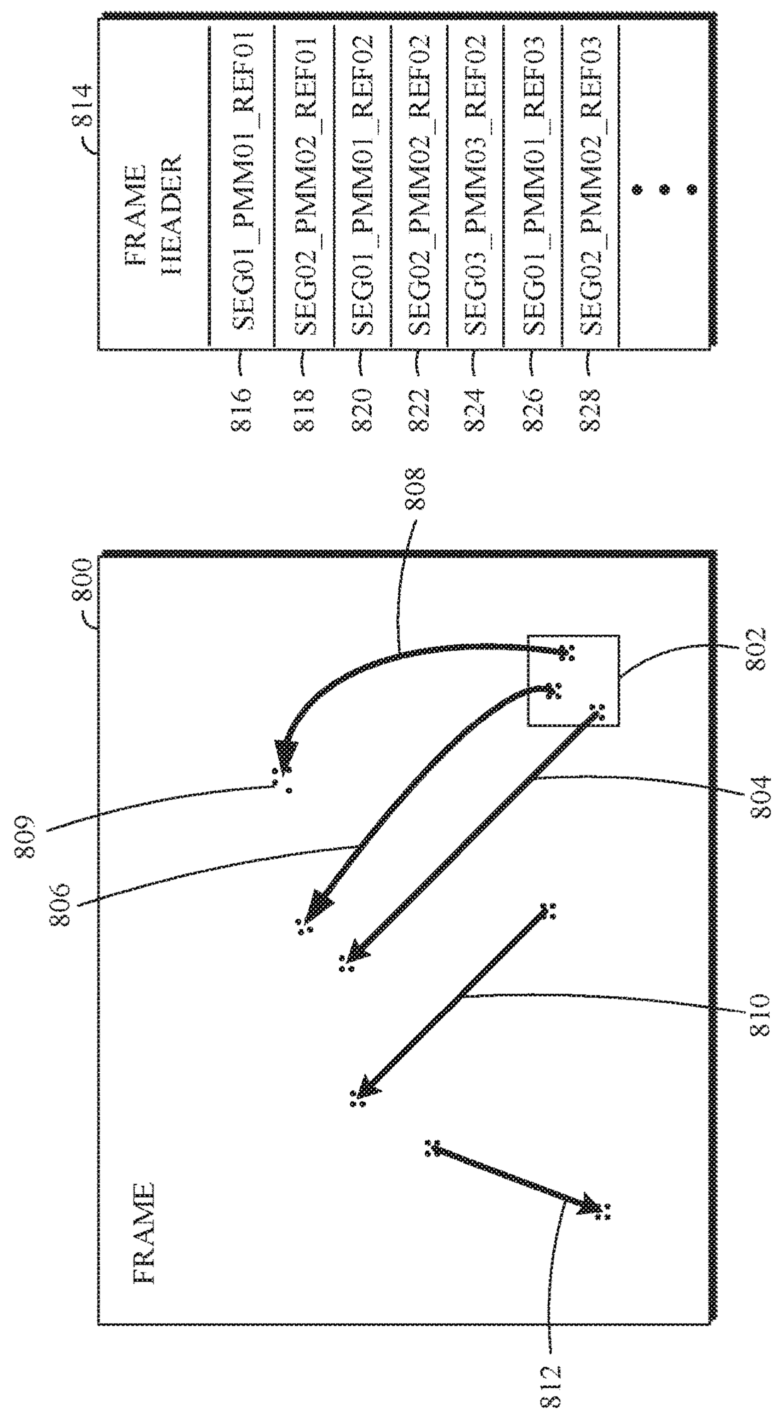
FIG. 8 is an illustration of examples of motion within a video frame according to implementations of this disclosure.

FIG. 8 is an illustration of examples of motion within a video frame 800 according to implementations of this disclosure. While not specifically indicated, it should be understood that the end points of the motion directions (e.g., motion 808) of FIG. 8 refer to pixel positions within a reference frame. For example, motion end point 809 refers to positions within a reference frame. This is so because motion is described with respect to another frame, such as a reference frame. A block 802 within the video frame 800 can include warped motion. Warped motion is motion that might not be accurately predicted using motion vectors determined via translational motion compensation (e.g., translational inter prediction as described above). For example, the motion within the block 802 might scale, rotate, or otherwise move in a not entirely linear manner in any number of different directions. Translational motion compensation can miss certain portions of the motion falling outside of the rectangular geometry or use an unnecessary number of bits to predict the motion. As such, a prediction block used to encode or decode the block 802 can be formed, or generated, using a parameterized motion model.

Motion within the video frame 800 may be global motion. For example, motion within the video frame 800 can be considered a global motion where a large number of pixels of the blocks of the video frame 800 yield a low prediction error. A prediction error threshold can be defined, and values for all or a portion of the pixels of the blocks of the video frame 800 can be compared thereto. In another example, motion within the video frame 800 can be considered global motion where it is in a direction common with most other motion within the video frame 800. A video frame can contain more than one global motion. Portions of the pixels exhibiting the same global motion can be grouped into a segment.

The video frame 800 includes motion at 804, 806, and 808. The motion at 804, 806, and 808 demonstrate motion of pixels of the block 802 in a generally common direction to linear and non-linear locations external to the block 802 within the video frame 800. For example, the motion shown at 804 is a translational motion from a leftmost set of pixels of the block 802. The motion shown at 806 is a rotational motion from a middle set of pixels of the block 802. The motion shown at 808 is a warped motion from a rightmost set of pixels of the block 802. Because the direction of the motion shown at 804, 806, and 808 is a most common direction within the video frame 800, the motion shown at 804, 806, and 808 is global motion. The group of pixels of the video frame 800 exhibiting the same global motion can be grouped into one segment. More than one global motion can be associated with the frame. Each global motion can be associated with a segment of the frame.

The global motion within the video frame 800 may not be entirely associated with the block 802. For example, the global motion can include motion of pixels located within the video frame 800 and outside of the block 802, such as is shown at 810. In addition to the global motion, the video frame 800 may have other global motion within a portion of the video frame 800. For example, another motion is shown at 812 as moving pixels in a direction different from the global motion shown at 804, 806, 808, and 810. Pixels associated with the other global motion within the video frame 800 can be grouped into another segment. The video frame 800 may include multiple global motions.

A frame header 814 of the video frame 800 includes references to reference frames available for encoding or decoding the block 802. The references to the reference frames in the frame header 814 can be for parameterized motion model associated with those reference frames. A parameterized motion model corresponds to a motion model type (described later with respect to FIG. 9) and indicates how pixels of the block 802 can be warped to generate a prediction block usable for encoding or decoding the block 802. The frame header 814 can include one or more parameterized motion models each corresponding to a segment of the video frame 800.

For example, the parameterized motion model 816 corresponds to a first motion model of a first segment associated with a first reference frame. The parameterized motion model 818 corresponds to a second motion model of a second segment associated with the first reference frame. The parameterized motion model 820 corresponds to a first motion model of a first segment associated with a second reference frame. The parameterized motion model 822 corresponds to a second motion model of a second segment associated with the second reference frame. The parameterized motion model 824 corresponds to a third motion model of a third segment associated with the second reference frame. The parameterized motion model 826 corresponds to a first motion model of a first segment associated with a third reference frame. The parameterized motion model 828 corresponds to a second motion model of a second segment associated with the third reference frame.

The parameterized motion models associated with a reference frame may correspond to one or more motion model types. For example, the parameterized motion model 816 and the parameterized motion model 818 may respectively correspond to a homographic motion model and an affine motion model for the first reference frame. In some implementations, each reference frame can be associated with multiple parameterized motion models of a single motion model type. For example, the parameterized motion model 816 and the parameterized motion model 818 may both correspond to different homographic motion models. However, in some implementations, a reference frame may be limited to one motion model for each motion model type. Further, in some implementations, a reference frame may be limited to a single motion model total. In such a case, that motion model may be replaced in certain situations, such as where a new motion model results in a lower prediction error.

Parameterized motion models may indicate a global motion within multiple frames of a video sequence. As such, the parameterized motion models encoded within the frame header 814 may be used to generate prediction blocks for multiple blocks in multiple frames of a video sequence. The reference frames associated with parameterized motion models in the frame header 814 may be selected from a reference frame buffer, such as by using bits encoded to the frame header 814. For example, the bits encoded to the frame header 814 may point to virtual index locations of the reference frames within the reference frame buffer.

FIGS. 9A-D are illustrations of examples of warping pixels of a block of a video frame according to a parameterized motion model according to implementations of this disclosure. A parameterized motion model used to warp pixels of a block of a frame can correspond to a motion model type. The motion model type that corresponds to a parameterized motion model may be a homographic motion model type, an affine motion model type, a similarity motion model type, or a translational motion model type. The parameterized motion model to use can be indicated by data associated with reference frames, such as within frame headers of an encoded bitstream.

FIGS. 9A-D depict different motion model types used to project pixels of a block to a warped patch within a reference frame. The warped patch can be used to generate a prediction block for encoding or decoding that block. A parameterized motion model indicates how the pixels of a block are to be scaled, rotated, or otherwise moved when projected into the reference frame. Data indicative of pixel projections can be used to identify parameterized motion models corresponding to a respective motion model. The number and function of the parameters of a parameterized motion model depend upon the specific projection used.

Figure 9A:
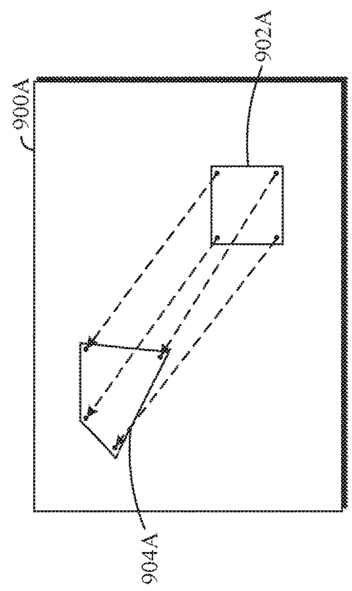
FIGS. 9A-D are illustrations of examples of warping pixels of a block of a video frame according to a parameterized motion model according to implementations of this disclosure.

In FIG. 9A, pixels of a block 902A are projected to a warped patch 904A of a frame 900A using a homographic motion model. A homographic motion model uses eight parameters to project the pixels of the block 902A to the warped patch 904A. A homographic motion is not bound by a linear transformation between the coordinates of two spaces. As such, the eight parameters that define a homographic motion model can be used to project pixels of the block 902A to a quadrilateral patch (e.g., the warped patch 904A) within the frame 900A. Homographic motion models thus support translation, rotation, scaling, changes in aspect ratio, shearing, and other non-parallelogram warping. A homographic motion between two spaces is defined as follows:

$$x = \frac{a*X + b*Y + c}{g*X + h*Y + 1};\text{ and } y = \frac{d*X + e*Y + f}{g*X + h*Y + 1}.$$

In these equations, (x, y) and (X, Y) are coordinates of two spaces, namely, a projected position of a pixel within the frame 900A and an original position of a pixel within the block 902A, respectively. Further, a, b, c, d, e, f, g, and h are the homographic parameters and are real numbers representing a relationship between positions of respective pixels within the frame 900A and the block 902A. Of these parameters, a represents a fixed scale factor along the x-axis with the scale of the y-axis remaining unchanged, b represents a scale factor along the x-axis proportional to the y-distance to a center point of the block, c represents a translation along the x-axis, d represents a scale factor along the y-axis proportional to the x-distance to the center point of the block, e represents a fixed scale factor along the y-axis with the scale of the x-axis remaining unchanged, f represents a translation along the y-axis, g represents a proportional scale of factors of the x- and y-axes according to a function of the x-axis, and h represents a proportional scale of factors of the x- and y-axes according to a function of the y-axis.

Figure 9B:
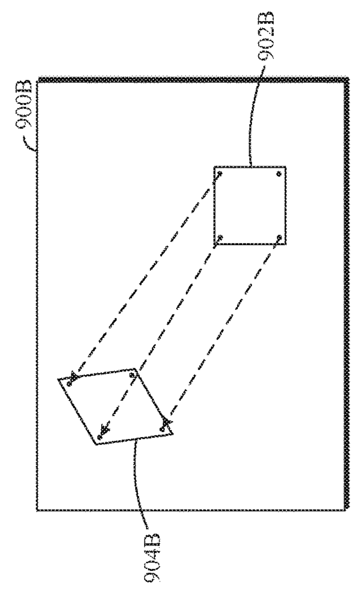

In FIG. 9B, pixels of a block 902B are projected to a warped patch 904B of a frame 900B using an affine motion model. An affine motion model uses six parameters to project the pixels of the block 902B to the warped patch 904B. An affine motion is a linear transformation between the coordinates of two spaces defined by the six parameters. As such, the six parameters that define an affine motion model can be used to project pixels of the block 902B to a parallelogram patch (e.g., the warped patch 904B) within the frame 900B. Affine motion models thus support translation, rotation, scale, changes in aspect ratio, and shearing. The affine projection between two spaces is defined as follows:

$$x=a*X+b*Y+c;\text{ and } y=d*X+e*Y+f.$$

In these equations, (x, y) and (X, Y) are coordinates of two spaces, namely, a projected position of a pixel within the frame 900B and an original position of a pixel within the block 902B, respectively. Also, a, b, c, d, e, and f are affine parameters and are real numbers representing a relationship between positions of respective pixels within the frame 900B and the block 902B. Of these, a and d represent rotational or scaling factors along the x-axis, b and e represent rotational or scaling factors along the y-axis, and c and f respectively represent translation along the x- and y-axes.

Figure 9C:
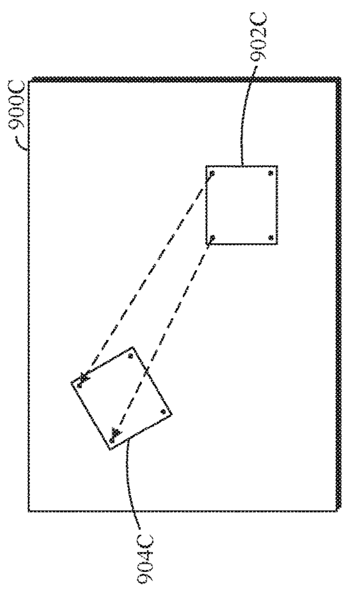

In FIG. 9C, pixels of a block 902C are projected to a warped patch 904C of a frame 900C using a similarity motion model. A similarity motion model uses four parameters to project the pixels of the block 902C to the warped patch 904C. A similarity motion is a linear transformation between the coordinates of two spaces defined by the four parameters. For example, the four parameters can be a translation along the x-axis, a translation along the y-axis, a rotation value, and a zoom value. As such, the four parameters that define a similarity motion model can be used to project pixels of the block 902C to a square patch (e.g., the warped patch 904C) within the frame 900C. Similarity motion models thus support square to square transformation with rotation and zoom.

Figure 9D:
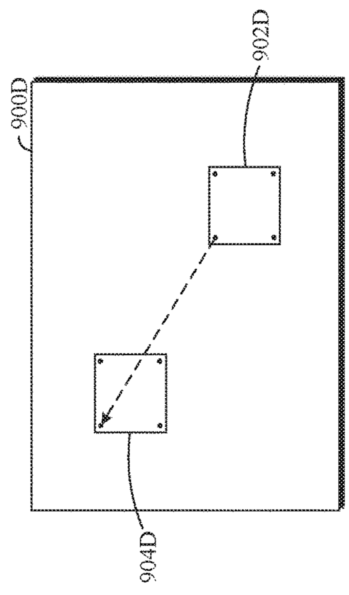

In FIG. 9D, pixels of a block 902D are projected to a warped patch 904D of a frame 900D using a translational motion model. A translational motion model uses two parameters to project the pixels of the block 902D to the warped patch 904D. A translational motion is a linear transformation between the coordinates of two spaces defined by the two parameters. For example, the two parameters can be a translation along the x-axis and a translation along the y-axis. As such, the two parameters that define a translational motion model can be used to project pixels of the block 902D to a square patch (e.g., the warped patch 904D) within the frame 900D.

Returning again to FIG. 6, at 604, the process 600 determines a first motion vector for the current block based on the segmentation. As described above, the video frame can be partitioned with respect to at least some of the reference frames into segments. As such, the current block can be part of many segments, each corresponding to a reference frame. For at least some of the segments that the current frame belongs to, the process 600 determines a respective motion vector.

A motion vector is generated between the current block and a reference frame selected based on the parameterized motion model associated with the segment of the current block as described with respect to FIGS. 7, 8, and 9. As such, the motion vector between the current block and a reference frame selected based on the parameterized motion model can be a reference to the parameterized motion model. That is, the motion vector indicates which reference frame and the parameterized motion model.

The motion vector can be generated by warping pixels of the current block to a warped patch within the reference frame according to the selected parameterized motion model. For example, the pixels of the current block are projected to the warped patch within the reference frame. The shape and size of the warped patch to which the pixels of the current block are projected depends upon the motion model associated with the selected parameterized motion model. The warped patch can be a rectangular patch or a non-rectangular patch. For example, if the parameterized motion model is of a translational motion model type, the warped patch is a rectangular block that is the same size as the current block. In another example, if the parameterized motion model is of a homographic motion model type, the warped patch may be any quadrilateral and of any size. The position of the warped patch also depends upon the motion model. For example, the parameters of the parameterized motion model indicates an x-axis and/or y-axis translation for the warped patch. The parameters of the parameterized motion model may further indicate a rotation, zoom, or other motional change for the warped patch.

The warped patch can then be unwarped using the motion vector to return the current block to generate a prediction block. The prediction block can have a rectangular geometry for predicting the current block. For example, unwarping the projected pixels of the warped patch after respective pixels are projected to the warped patch of the reference frame can include projecting the warped patch to a rectangular block using the generated motion vector. The pixel position coordinates of the warped patch of the reference frame can be projected to the rectangular block based on respective coordinate translations to the rectangular block. The resulting rectangular block can be used to generate the prediction block.

At 606, the process 600 determines a second motion vector for the current block using translational motion compensation. That is, the process 600 can determine the second motion vector using inter prediction as described above.

At 608, the process 600 encodes, for the current block, the one of the first motion vector and the second motion vector corresponding to a smaller error. The smaller error can be the error corresponding to the best rate-distortion value. A rate-distortion value refers to a ratio that balances an amount of distortion (i.e., loss in video quality) with rate (i.e., the number of bits) used for encoding. For each of the motion vectors determined at 604 and 606, the process 600 can determine the motion vector corresponding to the best rate-distortion value.

The process 600 can encode, in the encoded bitstream, the selected motion vector. In the case where the selected motion vector is a segmentation-based motion vector (i.e., a motion vector determined at 604), the process 600 can encode the parameters of the parameterized motion model used to determine the motion vector. Alternatively, the process 600 can encode the motion model type corresponding to the parameterized motion model.

Figure 10:
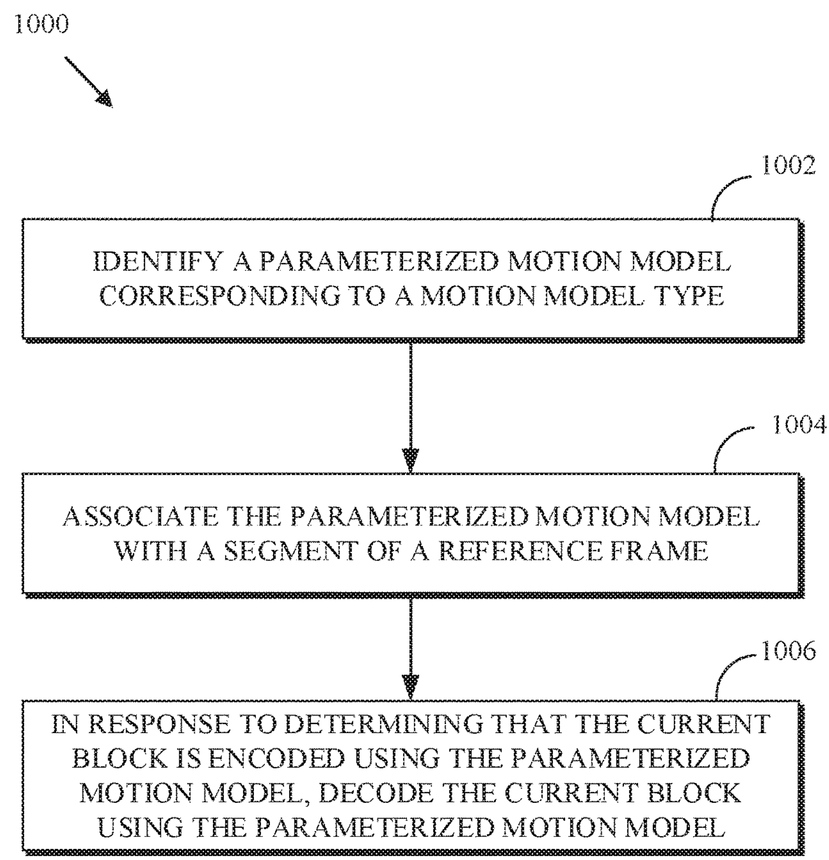
FIG. 10 is a flowchart diagram of a process for decoding a current block using segmentation-based parameterized motion models according to an implementation of this disclosure.

FIG. 10 is a flowchart diagram of a process 1000 for decoding a current block of a video frame according to one implementation of the disclosure. The process 1000 receives an encoded bitstream, such as the compressed bitstream 420 of FIG. 5. The process 1000 may be performed by a decoder. For example, the process 1000 can be performed in whole or in part by the intra/inter prediction stage 508 of the decoder 500. The process 1000 can be performed in whole or in part during the reconstruction path (shown by the dotted connection lines) of the encoder 400 of FIG. 4. Implementations of the process 1000 can be performed by storing instructions in a memory such as the memory 204 of the receiving station 106, or the transmitting station 102, to be executed by a processor such as CPU 202, for example.

The process 1000 can be implemented using specialized hardware or firmware. Some computing devices can have multiple memories, multiple processors, or both. The steps or operations of the process 1000 can be distributed using different processors, memories, or both. For simplicity of explanation, the process 1000 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1002, the process 1000 identifies a parameterized motion model corresponding to a motion model type. The parameterized motion model can be identified based on information encoded in a header of a current frame (i.e., frame header) being decoded. The current frame being decoded is a frame containing the current block.

The process 1000 can identify the parameterized motion model by decoding the parameters of the parameterized motion model from the encoded bitstream. Alternatively, the process 1000 can decode a motion model type from the encoded bitstream. The process 1000 can then generate the parameters of the parameterized motion model corresponding to the motion model type. The process 1000 can determine the parameters of the parameterized motion model as described above with respect to the FIG. 6.

At 1004, the process 1000 associates the parameterized motion model with a segment of a reference frame. The process 1000 can associate the parameterized motion model with the segment of the reference frame as described above with respect to FIG. 8. The process 1000 can receive, in the frame header, information regarding the segmentation of the frame. The information regarding the segmentation can enable the process 1000 to determine, for example, the number of segments of the current frame with respect to at least some of the reference frames. The information regarding the segmentation can enable the process 1000 to determine, with respect to a reference frame, which segment includes the current block.

At 1006, the process 1000 decodes the current block using the parameterized motion model in response to determining that the current block is encoded using the parameterized motion model. The current block header can include an indication identifying that the current block is encoded using the parameterized motion model. For example, the current block header can include an indicator of a global motion model type used to encode the current block. For example, the indicator can indicate that global motion was used to encode the current block or that no global motion was used to encode the current block (e.g., zero global motion).

In response to determining that the current block is encoded using the parameterized motion model, the process 1000 decodes the current block using the parameterized motion model. In response to determining that the current block is not encoded using the parameterized motion model, the process 1000 decodes the current block using translational motion compensation.

For simplicity of explanation, the processes 600 and 1000 are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The frame header for an inter-frame frame of the video sequence can include data indicating one or more parameterized motion models usable to encode or decode one or more blocks thereof. For example, the data encoded to the frame header of an inter-frame frame can include the parameters of a parameterized motion model. The data may also include a coded flag indicating a number of parameterized motion models available to the inter-frame frame.

In some implementations, a reference frame may not have a parameterized motion model. For example, there may be too many distinct motions within the reference frame to identify a global motion. In another example, the prediction errors determined for warped pixels based on motion models may not satisfy the threshold. In such a case, blocks of frames using that reference frame can be encoded or decoded using zero motion. A zero motion model may by default be encoded to the frame header of all or some of the inter-frame frames of a video sequence.

In some implementations, a current block encoded using a parameterized motion model is decoded by warping the pixels of the encoded block according to the parameterized motion model. The warped pixels of the encoded block are then interpolated. For example, the interpolation can be performed using a 6-tap by 6-tap subpixel filter. In another example, the interpolation can be performed using bicubic interpolation. Bicubic interpolation can include using a 4-tap by 4-tap window to interpolate the subpixel values of an encoded block. Bicubic interpolation can include applying a horizontal sheer and a vertical sheer to an encoded block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method of encoding a current block of a video frame, comprising:

partitioning the video frame into blocks, wherein the blocks comprise the current block;

for each of a plurality of reference frames, performing steps comprising:

segmenting, based on motion model types each having a respective complexity, the video frame with respect to the each reference frame to obtain a reference-frame-based segmentation, wherein the reference-frame-based segmentation comprises segments, wherein each segment of the segments comprises a respective subset of the blocks of the video frame, and wherein a segment of the segments comprises the current block and a respective parameterized motion model for the segment;

selecting, for the segment comprising the current block, a least complex motion model type that has a value of an error metric below a threshold, wherein the error metric for a parameterized motion model of the respective parameterized motion models is:

$$E=\Sigma\alpha|c_{xy}-w_{xy}|^{0.6}$$

where $\alpha$ is a weight value, $c_{xy}$ is a first pixel at (x, y) in the video frame, and $w_{xy}$ is a second pixel at (x, y) in a warped frame, the warped frame corresponding to the video frame warped according to the parameterized motion model; and selecting, for the segment, a selected parameterized motion model corresponding to the least complex motion model type;

determining a first motion vector for the current block based on the selected parameterized motion model;

determining a second motion vector for the current block using translational motion compensation; and encoding, for the current block, the one of the first motion vector and the second motion vector corresponding to a smaller error.

2. The method of claim 1, wherein the segmenting the video frame with respect to the each reference frame to obtain the reference-frame-based segmentation comprises:

determining, using a motion model type, parameters of the respective parameterized motion model.

3. The method of claim 2, wherein the motion model type is selected from a set comprising a homographic motion model type, an affine motion model type, a similarity motion model type, and translational motion model type.

4. The method of claim 2, wherein the encoding the one of the first motion vector and the second motion vector comprises:

encoding the parameters corresponding to the least complex motion model type.

5. The method of claim 1, wherein the encoding the one of the first motion vector and the second motion vector comprises:

encoding a motion model type corresponding to the parameterized motion model.

6. An apparatus configured to encode a current block of a video frame, the apparatus comprising:

a processor configured to execute instructions stored in a non-transitory storage medium to:

segment the video frame with respect to a reference frame resulting in a segmentation, the segmentation comprising a segment containing the current block and a parameterized motion model for the segment, wherein to segment the video frame with respect to the reference frame comprises to:

segment the video frame with respect to the reference frame based on one or more of a plurality of motion model types to provide respective segmentations, each of the plurality of motion model types having a respective complexity;

calculate a global motion error for each segmentation; and select the segmentation corresponding to a least complex motion model type corresponding to an error metric being below a threshold, wherein the error metric is:

$$E=\Sigma\alpha|c_{xy}-w_{xy}|^{\beta}$$

where $\alpha$ is a weight value, $\beta$ is a value that is less than 1, $c_{xy}$ is a first pixel at (x, y) in the video frame, and $w_{xy}$ is a second pixel at (x, y) in a warped frame, the warped frame corresponding to the video frame warped according to the parameterized motion model;

determine a first motion vector for the current block based on the segmentation;

determine a second motion vector for the current block using translational motion compensation; and encode, for the current block, the one of the first motion vector and the second motion vector corresponding to a smaller error.

7. The apparatus of claim 6, wherein the instructions to segment the video frame with respect to a reference frame resulting in a segmentation include instructions executable by the processor to:

determine, using a motion model type, parameters of the parameterized motion model.

8. The apparatus of claim 7, wherein the motion model type is selected from a set comprising a homographic motion model type, an affine motion model type, a similarity motion model type, and translational motion model type.

9. The apparatus of claim 7, wherein the instructions to encode the one of the first motion vector and the second motion vector include instructions executable by the processor to:

encode the parameters of the parameterized motion model.

10. A method of encoding a current block of a video frame, comprising:

segmenting the video frame with respect to a reference frame resulting in a segmentation, the segmentation comprising a segment containing the current block;

for each of a plurality of motion model types, determining a parameterized motion model for the segment, each of the plurality of the motion model types having a respective complexity;

for each of the determined parameterized motion models, determining a value of an error metric;

selecting the determined parameterized motion model corresponding to a least complex motion model type that has a respective value of the error metric below a threshold;

determining a first motion vector for the current block based on the selected parameterized motion model;

determining a second motion vector for the current block using translational motion compensation; and encoding, for the current block, the one of the first motion vector and the second motion vector corresponding to a smaller error.

11. The method of claim 10, wherein the error metric for a parameterized motion model is:

$$E=\Sigma\alpha|c_{xy}-w_{xy}|^{0.6}$$

where $\alpha$ is a weight value, $c_{xy}$ is a first pixel at (x, y) in the video frame, and $w_{xy}$ is a second pixel at (x, y) in a warped frame, the warped frame corresponding to the video frame warped according to that parameterized motion model.

12. The method of claim 11, wherein the smaller error is the error corresponding to a best rate-distortion value.

* * * * *